United States Patent [19]
Hsieh et al.

[11] Patent Number: 4,489,406
[45] Date of Patent: * Dec. 18, 1984

[54] OPTICAL MEMORY SYSTEM HAVING A SHORT SEEK CAPABILITY

[75] Inventors: Der-Chang Hsieh, Thousand Oaks; Edward V. LaBudde, Newbury Park, both of Calif.

[73] Assignee: Burroughs Corporation, Detroit, Mich.

[*] Notice: The portion of the term of this patent subsequent to Feb. 14, 2001 has been disclaimed.

[21] Appl. No.: 349,534

[22] Filed: Feb. 17, 1982

[51] Int. Cl.³ .............................................. G11B 7/00
[52] U.S. Cl. ........................................ 369/32; 369/44
[58] Field of Search ....................... 369/30, 31, 32, 33, 369/44, 45, 46, 111; 360/77, 78; 358/342, 907; 365/215, 234

[56] References Cited

U.S. PATENT DOCUMENTS

| | | | |
|---|---|---|---|
| 3,854,015 | 12/1974 | Janssen | 358/907 |
| 4,037,252 | 7/1977 | Janssen | 369/46 |
| 4,057,832 | 11/1977 | Kappert | 369/46 |
| 4,106,058 | 8/1978 | Romeas et al. | 369/32 |
| 4,138,663 | 2/1979 | Lehureau et al. | 369/33 |
| 4,142,209 | 2/1979 | Hedlund et al. | 369/44 |
| 4,199,820 | 4/1980 | Ohtake et al. | 369/33 |
| 4,236,232 | 11/1980 | Jansen et al. | 365/234 |
| 4,330,880 | 5/1982 | Van Dijk | 369/32 |
| 4,338,682 | 7/1982 | Hosaka et al. | 369/44 |
| 4,363,116 | 12/1982 | Kleuters et al. | 369/45 |
| 4,375,091 | 2/1983 | Dakin et al. | 369/32 |

OTHER PUBLICATIONS

Paul M. Trethewey, "An Infra-red Based Beam Scanner Position Sensor", Wescon Electronic Show & Convention, Sep. 15-17, 1981, Brooks Hall & Civic Auditorium, Hilton Hotel, San Francisco, California, Region 6 IEEE Student Paper Competition, pp. 1-8.

*Primary Examiner*—Donald McElheny, Jr.
*Attorney, Agent, or Firm*—Nathan Cass; Kevin R. Peterson; David G. Rasmussen

[57] ABSTRACT

A high density optical storage system employing a laser beam for reading data in a track on a rotating optical disk containing a large number of closely spaced concentric tracks. When a short seek operation is to be provided, track following is temporarily suspended for an appropriate time period during which specially shaped waveform is applied to the galvanometer-controlled mirror in the path of the beam. This specially shaped waveform is a doublet comprising a pulse of one polarity followed by a pulse of the opposite polarity. The duration and amplitude of these opposite polarity pulses are chosen based on the number of tracks that the beam is to be moved and the mechanical characteristics of the system so that the galvanometer mirror will accurately move the beam the requested number of tracks. After movement of the beam has been completed, operation automatically returns to track following.

8 Claims, 12 Drawing Figures

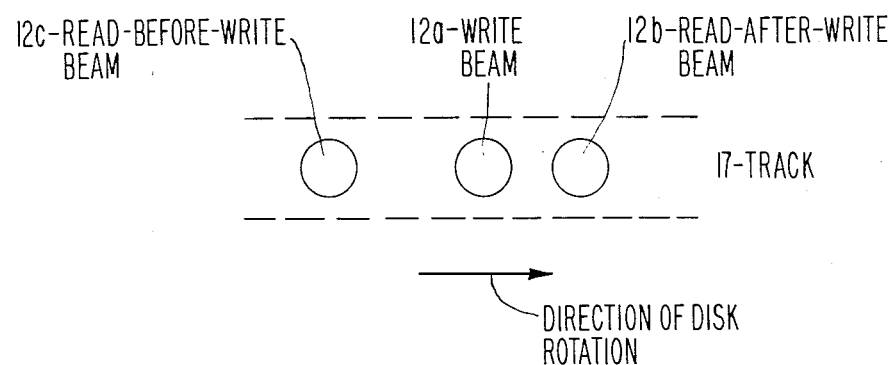
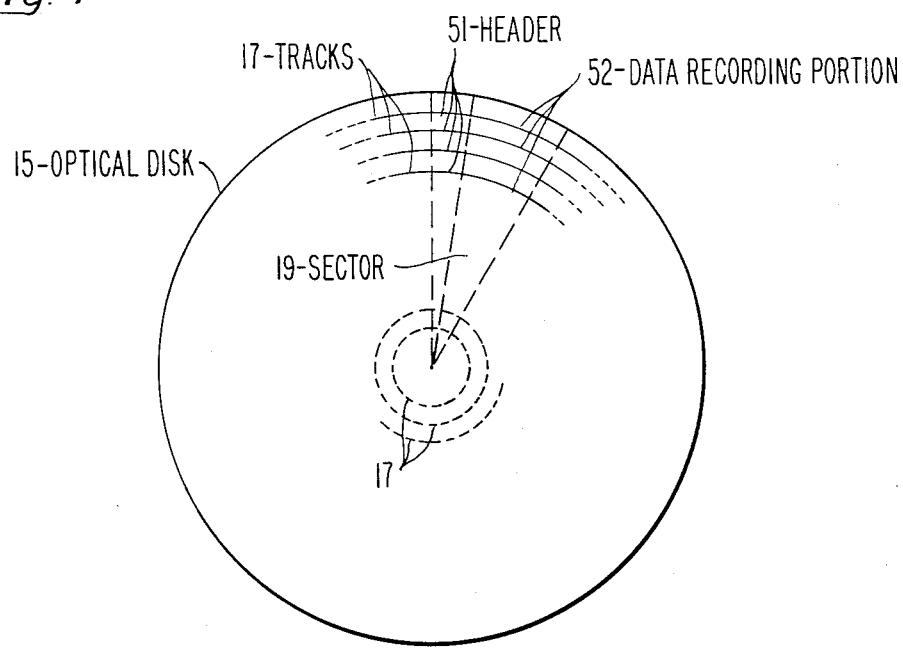

OPTICAL MEMORY SYSTEM HAVING A SHORT SEEK CAPABILITY

CROSS REFERENCE TO RELATED PATENT APPLICATIONS

This patent application contains subject matter related to our concurrently filed commonly assigned patent application Ser. No. 349,536 for Optical Memory System Having Improved Track Following; Ser. No. 349,468 for Optical Memory System Having an Improved Long Seek Capability; Ser. No. 349,535 for Optical Memory System Having Improved Track Following and Seeking Capabilities; and also to the commonly assigned copending patent applications Ser. No. 311,628, now U.S. Pat. No. 4,402,061; Ser. No. 311,629; Ser. No. 311,630; and Ser. No. 311,745, all filed Oct. 15, 1981.

BACKGROUND OF THE INVENTION

The present invention relates generally to improved methods and apparatus for recording and/or reading data in a high density data storage system, and more particularly to improved methods and apparatus for providing reliable and accurate positioning control during the recording and reading of data in a high density optical storage system.

In recent years considerable effort has been expended to develop improved methods and apparatus for optically recording and reading on a suitable medium because of the unusually high recording density potential offered by optical recording. Examples of various known methods and approaches are revealed in the following references:

| U.S. PATENT DOCUMENTS | | |
|---|---|---|
| U.S. Pat. No. | Date Issued | Inventor(s) |
| 4,216,501 | 8/5/80 | Bell |
| 4,222,071 | 9/9/80 | Bell, et al. |
| 4,232,337 | 12/4/80 | Winslow, et al. |
| 4,243,848 | 1/6/81 | Utsumi |
| 4,243,850 | 1/6/81 | Edwards |
| 4,253,019 | 2/24/81 | Opheij |
| 4,253,734 | 3/3/81 | Komurasaki |
| 4,268,745 | 5/19/81 | Okano |

PUBLICATIONS
R.A. Bartolini, et al., "Optical Disk Systems Emerge", IEEE Spectrum, August 1978, pp. 20–28.
G.C. Kenney, et al., "An Optical Disk Replaces 25 Mag Tapes", IEEE Spectrum, February 1979, pp. 33–38.
K. Bulthuis, et al., "Ten Billion Bits on a Disk", IEEE Spectrum, August 1979, pp. 26–33.
A.E. Bell, et al., "Antireflection Structures for Optical Recording", IEEE Journal of Quantum Electronics, Vol. QE-14, No. 7, July 1978, pp. 487–495.

The subject matter of these references is to be considered as incorporated herein.

SUMMARY OF THE PRESENT INVENTION

As is well recognized, it is of crucial importance in an optical memory system that reliable and accurate positioning control be provided during recording and reproducing operations. This requirement is a particularly severe one in an optical memory system because of the very high data recording density typically employed, as compared, for example, to magnetic memory disk systems which store data at a relatively much lower density. It is accordingly the broad object of the present invention to provide significantly improved positioning control during the recording and/or reading of data in a high density storage system, such as an optical data storage system. The present invention is most particularly concerned with the manner in which a short seek function is provided in such a system.

In a particular preferred embodiment of the present invention, in which laser beams are used for recording and reproducing data on a rotatable optical disk, significantly improved short seek operation is achieved by employing a plurality of interactive servo loops which accurately and reliably control the positioning of a galvanometer and a linear motor which together determine the position of the recording and reproducing laser beams on the optical disk.

The specific nature of the invention as well as other objects, advantages, features and uses of the invention will become evident from the following description of a preferred embodiment taken in conjunction with the accompanying drawings.

BRIEF DESCRIPTION OF THE DRAWINGS

FIG. 2 illustrates the relative locations of the three laser beams provided by the system of FIG. 1 when focused on a selected track of the optical disk.

FIG. 4 is a schematic diagram generally illustrating the arrangement and formatting of data on the optical disk.

DETAILED DESCRIPTION OF THE INVENTION

Like numerals and characters designate like elements throughout the figures of the drawings.

Figure 1:
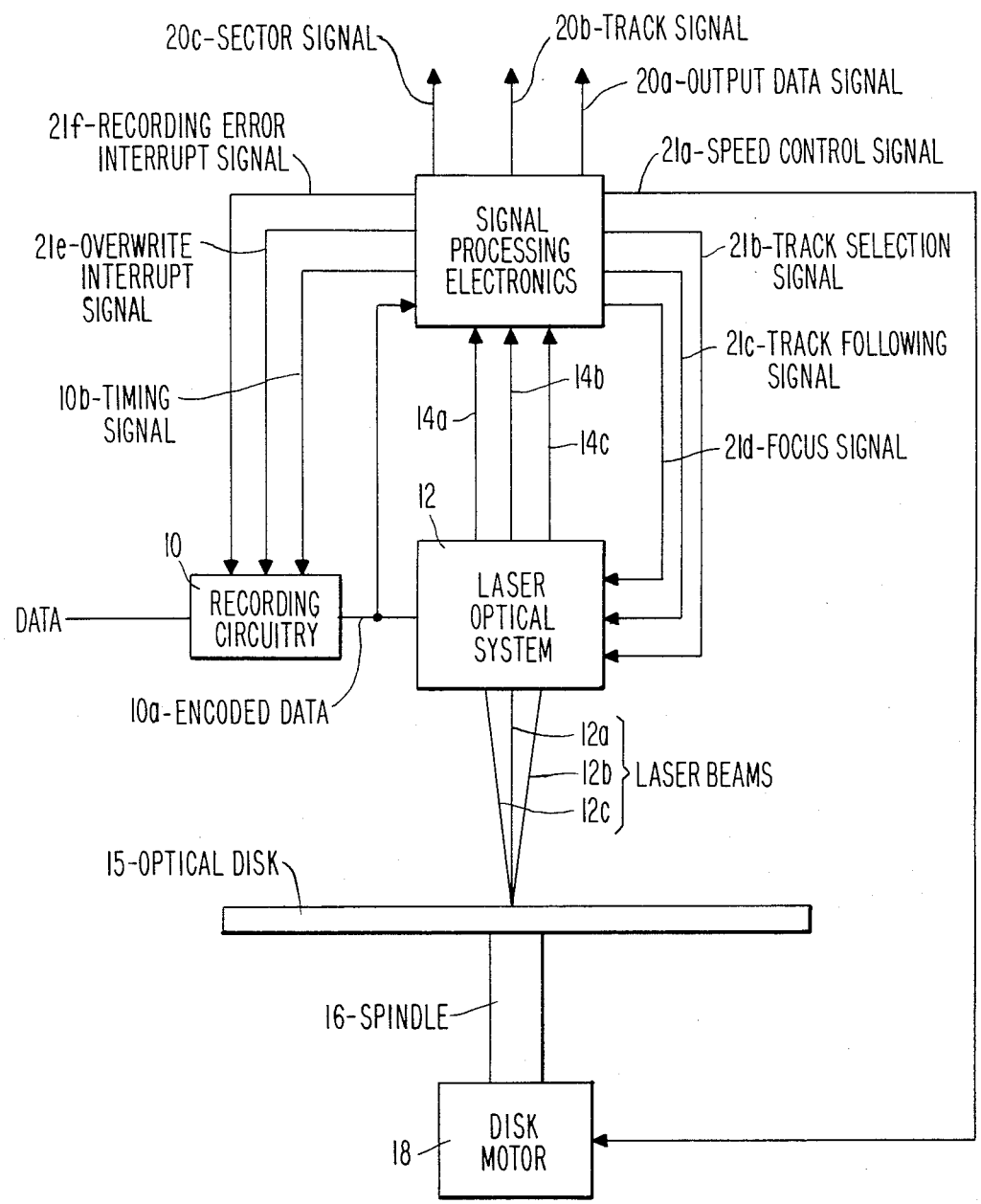
FIG. 1 is an overall block diagram of an optical recording and reproducing system in which the present invention may be incorporated.

Reference is initially directed to FIG. 1, which generally illustrates the basic portions of the embodiment of an optical recording and reading system disclosed in the aforementioned commonly assigned copending patent applications. The data to be recorded is first applied to recording circuitry 10 which encodes the applied data using, for example, a conventional encoding format of the type employed for magnetic recording, such as non-return-to-zero, return-to-zero, etc. Conventional error checking may also be provided for the encoded signal.

The encoded data 10a from the recording circuitry 10 is applied to a laser optical system 12. The laser optical system 12 generates three laser beams 12a, 12b and 12c which are focused at spaced locations along the center line of the same selected track of a preformatted optical disk 15 supported on a precision spindle 16 for rotation by a motor 18. The optical disk 15 may, for example, be a trilayer disk of the type disclosed in the aforementioned U.S. Pat. No. 4,222,071 and in the aforementioned article by Bell, et al. Each laser beam may, for example, be focused to a one micron spot size on the disk 15.

Laser beam 12a is a writing beam which is modulated by the encoded data so as to form optically detectable changes in a selected track of the optical disk 15 representative of the encoded data. It is to be understood that the optically detectable changes produced in the disk by the write laser beam 12a need not be physical changes, such as pits or physical holes. The only requirement is that optically detectable changes be produced in selected areas of the disk in response to the write laser beam 12a which are representative of the encoded data 10a. For the purpose of this description, all of the possible types of optically detectable changes that can be produced will hereinafter be referred to as optical holes.

Laser beams 12b and 12c shown in FIG. 1 are reading beams. As typically illustrated in FIG. 2, the reading beam 12b is a read-after-write beam which is accordingly focused behind the writing beam 12a on the center line 17a of a selected track 17, while the reading beam 12c is a read-before-write beam and is accordingly focused ahead of the writing beam 12a. The intensity of the read beams 12b and 12c are chosen so that they will not disturb the integrity of previously recorded information. The read beams are reflected from the disk 15 back to the optical system 12 which, in response thereto, derives a plurality of detection signals 14a, 14b and 14c which are applied to signal processing electronics 20. The signal processing electronics 20 also receives the encoded data signal 10a from the recording circuitry 10 for use in checking the accuracy of recorded data, as will hereinafter be considered.

The signal processing electronics 20 uses the detected signals 14a, 14b and 14c to provide an output data signal 20a corresponding to data read from the optical disk 15, along with signals 20b and 20c respectively identifying the track and sector locations on the disk from which the data is read. The signal processing electronics 20 also produces control signals 10b, 21a, 21b, 21c, 21d, 21e and 21f. More specifically, control signal 10b is applied to the recording circuitry 10 for synchronizing the encoding of data with disk rotation; control signal 21a is applied to the optical disk motor 18 to provide accurate speed control during recording and reading; control signal 21b is applied to the laser optical system 12 for controlling the radial position of the laser beams 12a, 12b and 12c for the purpose of selecting a desired track; control signal 21c is applied to the laser optical system 12 for providing precise track following of the laser beams on the selected track; control signal 21d is applied to the laser optical system 12 for providing precise focusing of the laser beams 12a, 12b and 12c; and control signal 21e is applied to the recording circuitry 10 for interrupting recording if the reflected read-before-write beam indicates the possibility of an overwrite recording error because the track ahead contains previously recorded data; and signal 21f is applied to the recording circuitry 10 to interrupt recording if a recording error occurs.

Figure 3:
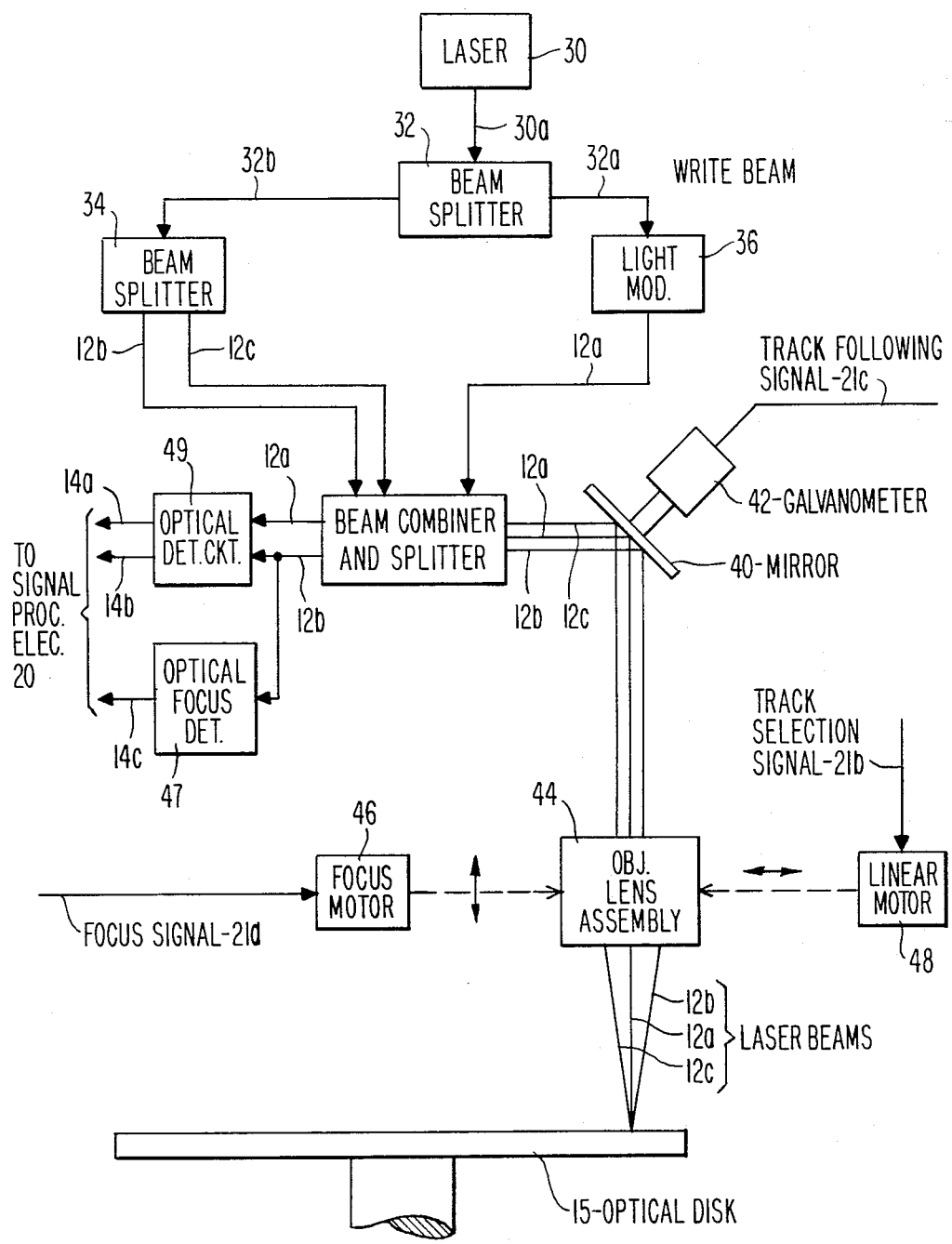
FIG. 3 is a block and schematic representation of the laser optical system shown in FIG. 1.

Reference is next directed to FIG. 3 which illustrates a preferred embodiment of the laser optical system 12 generally shown in FIG. 1. The various components of this laser optical system are illustrated in block and schematic form in FIG. 3 since their implementation can readily be provided by those skilled in the art, as will be evident from the aforementioned references.

As shown in FIG. 3, a laser 30 provides a beam 30a having a wavelength of, for example, 633 nanometers and a power level of, for example, 12 mw. This laser beam 30a is applied to a first beam splitter 32 which splits the beam into a high power beam 32a and a low power beam 32b. The low power beam 32b is applied to a second beam splitter 34 which further splits the beam 32b to provide read-after-write and read-before-write beams 12b and 12c, respectively. It is to be understood that a separate laser could be employed for providing one or more of the above beams if so desired.

The high power beam 32a in FIG. 3 is applied to a high speed light-modulator 36 which modulates the beam 32a in response to the encoded data 10a provided at the output from the recording circuitry 10 in FIG. 1. As also shown in FIG. 3, the resulting modulated high power beam at the output of the modulator 36 is used as the write beam 12a (FIG. 1) of the system and is applied to a beam combiner and splitter 38 along with the read beams 12b and 12c. The resulting three laser beams 12a, 12b and 12c produced at the output of the beam combiner and splitter 38 are then reflected off of a deflectable mirror 40 mounted to a galvanometer 42 which receives the track following signal 21c from the signal processing electronics 20 (FIG. 1). after reflection from the mirror 40, the laser beams 12a, 12b and 12c are applied to the disk 15 via an objective lens assembly 44. The objective lens assembly 44 is coupled to a focusing motor 46 which receives the focusing signal 21d from the signal processing electronics 20. Also coupled to the objective lens assembly 44 is a linear motor 48 which receives the track selection signal 21b from the signal processing electronics 20.

As further shown in FIG. 3, the reflected read beams 12b and 12c pass back to the beam combiner and splitter 38 via the objective lens assembly 44 and the mirror 40. The beam combiner and splitter 38 directs the reflected beams to optical detection circuitry 49 which converts the beams into corresponding read-after-write and read-before-write analog electrical signals 14a and 14b which are applied to the signal processing electronics 20 as shown in FIG. 1. Also, at least one of the reflected read beams 12a and 12b is applied to a geometric optical focus detector 47 which provides a relatively low gain, wide capture range signal 14c to the signal processing electronics 20 which is indicative of the quality of focusing of the beams on the selected track.

Next to be considered is the preformatting provided for the optical disk 15 in FIG. 1. An example of a typical preformatting arrangement is illustrated in FIGS. 4 and 5.

As generally indicated in FIG. 4, the optical disk 15 in the preferred embodiment being described contains a large plurality of circumferential tracks 17, for example, 40,000 tracks spaced two microns apart on a 14-inch disk. The disk 15 is also divided into a plurality of sectors 19. As indicated in FIG. 4, each track 17 within a sector 19 comprises a header 51 and a data recording portion 52. The data recording portion 52 is the portion into which data is written during recording and comprises the greater portion of the track length within each sector 19. The header 51 of a track 17 is encountered first in each sector 19 and is provided on the disk 5 prior to recording. A disk provided with such headers 51 is typically referred to as being preformatted.

Figure 5:
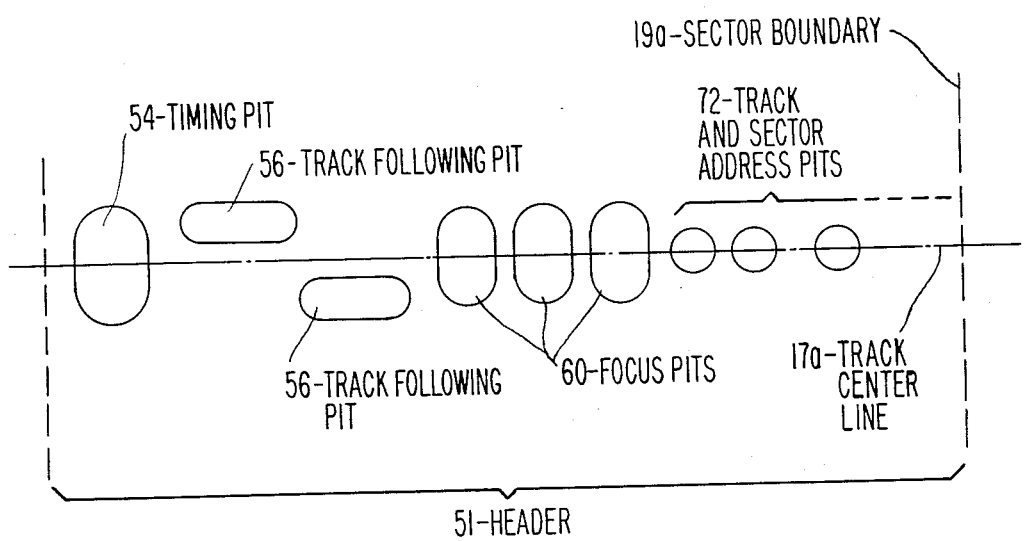
FIG. 5 is a schematic diagram illustrating details of the header formatting shown in FIG. 4.

FIG. 5 illustrates an example of a preformatted header 51 provided for each track 17 in each sector 19 of the disk 15 of FIG. 3. Although the optical holes constituting the header 51 need not be physically observable, as mentioned previously, it will be assumed for the purposes of this description that physical holes, such as pits, are employed for the exemplary header shown in FIG. 4. It will also be assumed that a pit exhibits a relatively high reflectance to an incident beam while other undisturbed disk areas exhibit a relatively low reflectance. It is to be understood that an arrangement may also be employed in which a portion of the optical recording is provided using physical holes, such as pits, and the remaining recorded portions are recorded using optical holes.

Figure 7:
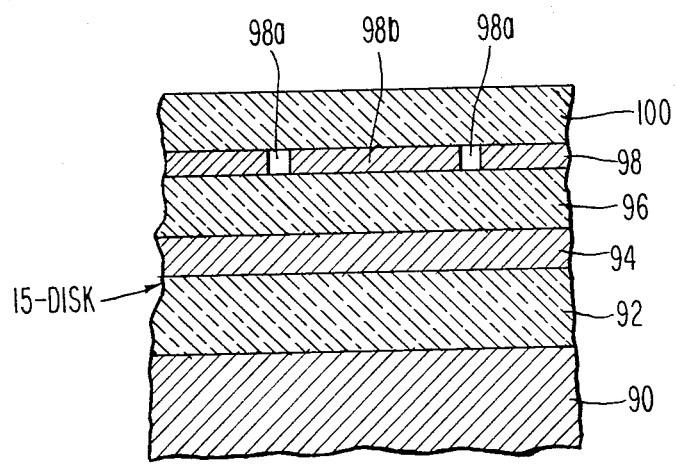
FIG. 7 is a cross-sectional view illustrating the construction of an optical disk employed in the system of FIG. 1.

Before continuing with the description of the header shown in FIG. 5, reference is directed to FIG. 7 which illustrates a cross-section of a disk 15 which may be employed in the system of FIG. 1. A supporting substrate 90 such as a 0.1 to 0.3 inch thick disk of aluminum is coated with an organic smoothing layer 92 of, for example, 20–60 microns prior to deposition thereon of a highly reflective opaque layer 94 of aluminum which may, for example, have a thickness of 400–800 Angstroms. An inorganic dielectric layer 96 such as a 800–1200 Angstrom layer of silicon dioxide which is transparent at the laser frequency is deposited over the aluminum reflector layer 94. An absorbing layer 98 which is absorptive at the laser frequency is then deposited over the dielectric layer 96. This absorbing layer 98 may for example be a 50 to 300 Angstrom layer of a metal such as tellurium. Finally, the absorbing layer 98 is overcoated with a protective layer 100, such as a silicon resin having a thickness of, for example, 150 to 500 microns.

Still with reference to FIG. 7, an anti-reflection (dark mirror) condition for a laser beam incident on unrecorded portions of the disk 15 is produced by appropriately choosing the thicknesses and optical characteristics of the layers 94, 96 and 98. Recording on such a disk 15 as illustrated in FIG. 7 is then accomplished by employing an appropriately focused, intensity-modulated recording laser beam (such as laser beam 12a in FIGS. 1 and 2) which records information by forming optically detectable changes, such as pits 98a, in the absorbing layer 98 along a selected track, the spacing and dimensions of these pits 98a being representative of the recorded data. Information is read from the disk 15 using an appropriately focused reading laser beam (such as laser beams 12b and 12c in FIGS. 1 and 2) which is chosen to be of insufficient intensity to affect unrecorded regions 98b of the absorbing layer 98 and has a frequency at which these unrecorded regions 100 exhibit the previously mentioned anti-reflection condition. As a result, the reflected reading beam will be intensity modulated by the pits 98a since the reading beam will experience a relatively high reflection when the beam is incident on a pit 98a, and a relatively low reflection when the reading beam is incident on an unwritten region 98b. It will be understood that dust particles on the upper surface of the protective layer 100 will be far removed from the focal plane of the optical system (that is, they will be out of focus) so as to have a negligible effect on the above described recording and reading operations.

Reference is now directed back to FIG. 5 for a more detailed consideration of the header 51. Since the header 51 is used in conjunction with the signal processing electronics 20 in FIG. 1 to provide for reliable and precise operation of the system, it will be helpful to describe the construction and arrangement of the exemplary header 51 shown in FIG. 5 in conjunction with FIG. 6 which illustrates an implementation of the signal processing electronics 20 generally shown in FIG. 1. The individual components of FIG. 6 can readily be implemented by those skilled in the art and are thus shown in block form.

Referring to the preformatted heading 51 shown in FIG. 5, it will be seen that immediately following the left sector boundary 19a is a relatively large pit 54 providing a relatively large change in optical reflectance which is used to provide synchronized timing for the signal processing electronics 20. This is accomplished by applying the detected read-after-write signal 14a in FIG. 3 to a peak detector 73 via a preamplifier 71. The peak detector 73 outputs a narrow pulse 73a corresponding to the pit 54 which it recognizes as the largest peak in the playback signal. This narrow output pulse 73a produced by the peak detector 73 is then applied as a timing reference to conventional timing circuitry 75 which generates various timing signals 10b, 21a, 75a, 75b, 75c, 75d and 75e for synchronizing the operation of the system with the disk 15. The purposes of these timing signals will become evident as the description proceeds.

Following pit 54 in FIG. 5 are two pits 56 and 58 elongated in a direction parallel to the track 17 and disposed on opposite sides of the track center line 17a in a staggered relationship. These pits 56 and 58 are used to provide precise track following. This is accomplished in FIG. 6 by applying the amplified read-after-write signal provided at the output of the preamplifier 71 to up-down integrator circuitry 77. The up-down integrator circuitry 77 integrates up in response to the detected signal obtained when the read-after-write beam traverses the portion of the track 17 corresponding to the elongated pit 56, and integrates down in response to the signal obtained when the read-after-write beam traverses the portion of the track 17 corresponding to the elongated pit 58. It will be understood that the difference between these two integrations will be a measure of the preciseness of track following by the laser beams. The dimensions and locations of the elongated pits 56 and 58 are chosen in conjunction with the size of the focused beam so that even very small deviations of the beam from the track center line 17a can be detected. This difference provided by integrator circuitry 77 when pits 56 and 58 are traversed during each sector is accordingly used to produce the control signal 21c which is applied to the galvanometer 42 (FIG. 3) to provide for precise following of a selected track by the laser beams.

Figure 6:
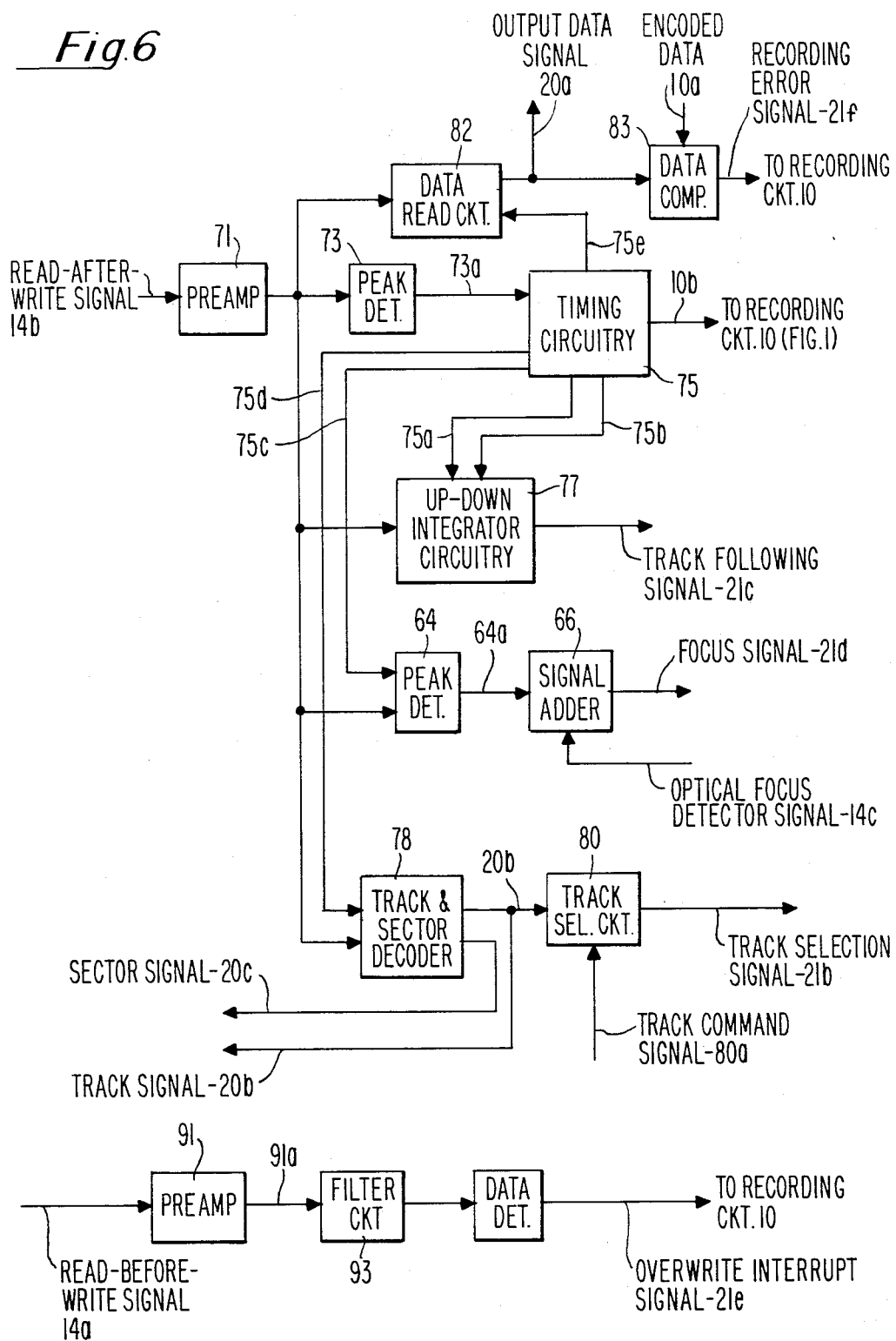
FIG. 6 is a block electrical diagram illustrating a preferred implementation of the signal processing electronics of FIG. 1.

It will be noted in FIG. 6 that the timing circuitry 75 provides timing signals 75a and 75b to the up-down integrator circuitry 77. The timing signal 75a is used to delineate the particular times during traversal of the header 51 of each sector for which up and down integrations should be performed so as to appropriately correspond with the locations of the elongated pits 56 and 58. The timing signal 75b is provided during each sector to the up-down integrator circuitry 77 to serve as a hold signal to hold until the next sector the resultant integrated value obtained after the read-after-write beam has completed traversing the second elongated pit 58.

Following the elongated pits 56 and 58 in the exemplary header 51 shown in FIG. 5 are a plurality of pits 60 elongated perpendicularly to the track center line 17a. The locations and dimensions of the pits 60 are chosen so that the reflected signal obtained upon traversing these pits 60 will have a peak value dependent upon the quality of focusing of the incident beam. This may be achieved, for example, by choosing the diameter of each pit 60 so that it is equal to the diameter of a properly focused beam. Then, if the incident beam is larger than the thickness of a pit 60 because of improper focusing, the reflected beam will have reduced power when each pit 60 is traversed, since only a portion of the beam will be reflected. It will also be understood that the spacing between the pits 60 along with the disk rotating speed determine the frequency at which the reflected beam is modulated when traversing the pits 60.

Referring again to FIG. 6, it will be understood that the read-after-write beam 14a applied to the preamplifier 71 during the period that the focusing pits 60 are being traversed contains the resulting focusing information. Accordingly, a peak detector 64, which is enabled by timing signal 75c during the period that the read-after-write beam is traversing the focusing pits 60, is provided to receive the amplified read-after-write beam at the output of the preamplifier 71. The peak detector 64 is adapted to respond to the magnitude of the applied signal within a frequency range determined by the spacing of the pits 60 to produce a relatively high gain output signal 64a which is a measure of the quality of focusing.

The output signal 64a from the peak detector 64 is applied to a signal adder 66 along with the signal 14c provided by the optical focus detector 47 in FIG. 3. The signal adder 66 appropriately combines these two signals 14c and 64a to produce the resulting signal 21d shown in FIG. 1 which is applied to the focusing motor 46 for maintaining precise focusing of the incident laser beams on the disk.

The purpose of providing a signal 21d to the focusing motor 46 comprised of the signal 14c from the geometric optical focus detector 47 and the signal 64a from the peak detector 64 will now be further considered. It will be understood that the signal 14c obtained from the geometric optical focus detector 47 in FIG. 3 provides only a relatively low gain control of the focusing distance which, while providing a wide capture range, typically results in producing a static or low frequency offset error. In accordance with the present invention, as exemplified in FIG. 5, a significantly more precise and offset free focus signal 21d is achieved by combining the geometric optical detector signal 14c with the peak-detected signal 64a derived from the focusing holes 60 which is capable of providing a relatively high gain. Of course, as also applies to the track following pits 56 and 58, the header 51 is repeated a sufficient number of times around each circumferential track 17 to obtain the desired precise and fast-acting control of focusing as well as of track following.

Continuing with the description of the header 51 shown in FIG. 5, the above described focusing pits 60 are followed by pits 72 recorded so as to provide an identification of the particular track and sector being traversed by the laser beams. In other words, the pits 72 represent a track and sector address and conventional encoding can be employed for this purpose, such as is used for identifying tracks and sectors on magnetic disks.

As shown in FIG. 6, the amplified read-after-write signal at the output of the preamplifier 71 is applied along with an appropriate enabling timing signal 75d to a track and sector decoder 78 which provides track and sector signals 20b and 20c respectively (see also FIG. 1) indicating the track and sector being traversed by the laser beams. The track signal 20b is also applied to track selection circuitry 80 along with a track command signal 80a indicative of a selected track to which it is desired that the laser beams be positioned. The track selection circuitry 80 compares the track indicated by the track signal 20b with the track requested by the track command signal 80a and in response thereto produces the signal 21b which is applied to the linear motor 48 in FIG. 3 to center the laser beams over the selected track.

Referring to FIG. 4 along with FIG. 5, it will be understood that, in the exemplary header 51 illustrated, the pits 72 which provide track and sector address identification are the last portion of the header 51. As pointed out previously, the resulting disk containing these headers is considered to be preformatted. Such preformatted disks will typically be provided to users who will make use of the preformatted headers in conjunction with signal processing electronics 20 such as illustrated in FIG. 6 for recording and reading data in the data recording portion 52 of each track 17 in each sector 19.

The amplified read-after-write signal provided at the output of the preamplifier 71 in FIG. 6 is also used for reading data from the data recording portion 52 of each sector 19 (FIGS. 4 and 5). Accordingly, the implementation of FIG. 6 includes data read circuitry 82 to which the output of the preamplifier 71 is applied for providing a data output signal 20a (see also FIG. 1) corresponding to the recorded digital data. The data read circuitry 82 is enabled during the time period that the read-after-write beam is traversing the data portion 52 (FIG. 4) of each sector 19 by the timing signal 75e. The resulting data output signal 20a read from the disk 15 is applied to an appropriate utilization device (not shown) along with the track and sector signals 20b and 20c which identify the track and sector from which data is read.

The data output signal 20a is also used during data recording to check that data is accurately being recorded. For this purpose FIG. 6 includes a data comparator 83 which receives both the data output signal 20a and the encoded data signal 10a from the recording circuitry 10. The data comparator 83 operates to compare the encoded data 10a with the corresponding data 20a read from the disk 15. If the comparator detects an error in the signals 10a and 20a, then the recording error interrupt signal 21f is produced which is applied to the recording circuitry 10 to interrupt recording.

An additional feature of the present invention resides in the manner in which the read-before-write beam 12c (FIG. 2) is employed. It will be appreciated that the density of recording made possible by the present invention is quite high. Thus, the possibility exists that an error in positioning of the laser beams may arise during recording which could result in destroying previously recorded data. Such previously recorded data can be very expensive to replace, if not lost forever if there is no back-up. This problem is prevented by the present invention by making use of the read-before-write beam 12c.

As illustrated in FIG. 6, the read-before-write signal 14b obtained from the optical detection circuitry 49 in FIG. 3 is applied to a preamplifier 91 whose output 91a is in turn applied to a data detector 95 via filter circuitry 93. The filter circuitry 93 is provided to prevent noise from interfering with the operation of the data detector 95. The data detector 95 is responsive to the presence of recorded data to produce an interrupt signal 95a which is applied to the recording circuitry 10 (FIG. 1) to halt recording, thereby protecting previously recorded data. It is to be understood that the read-before-write beam may also be used for other purposes, such as to check the quality of the track prior to recording, or to provide more precise track following and/or focusing control.

Figure 8:
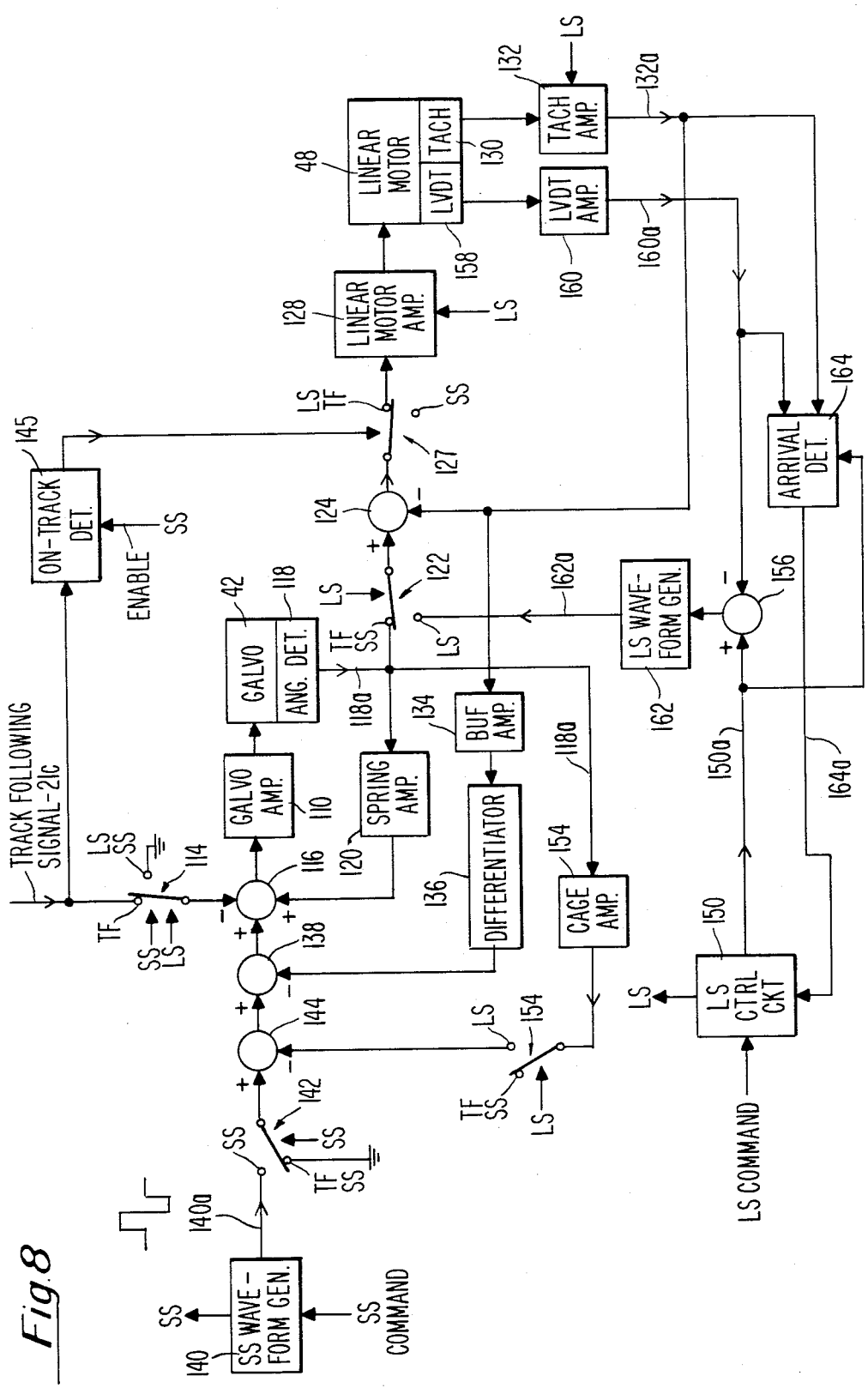
FIG. 8 is a block electrical diagram illustrating a preferred implementation of interactive servo control apparatus employed in the present invention.
Figures 9, 12:
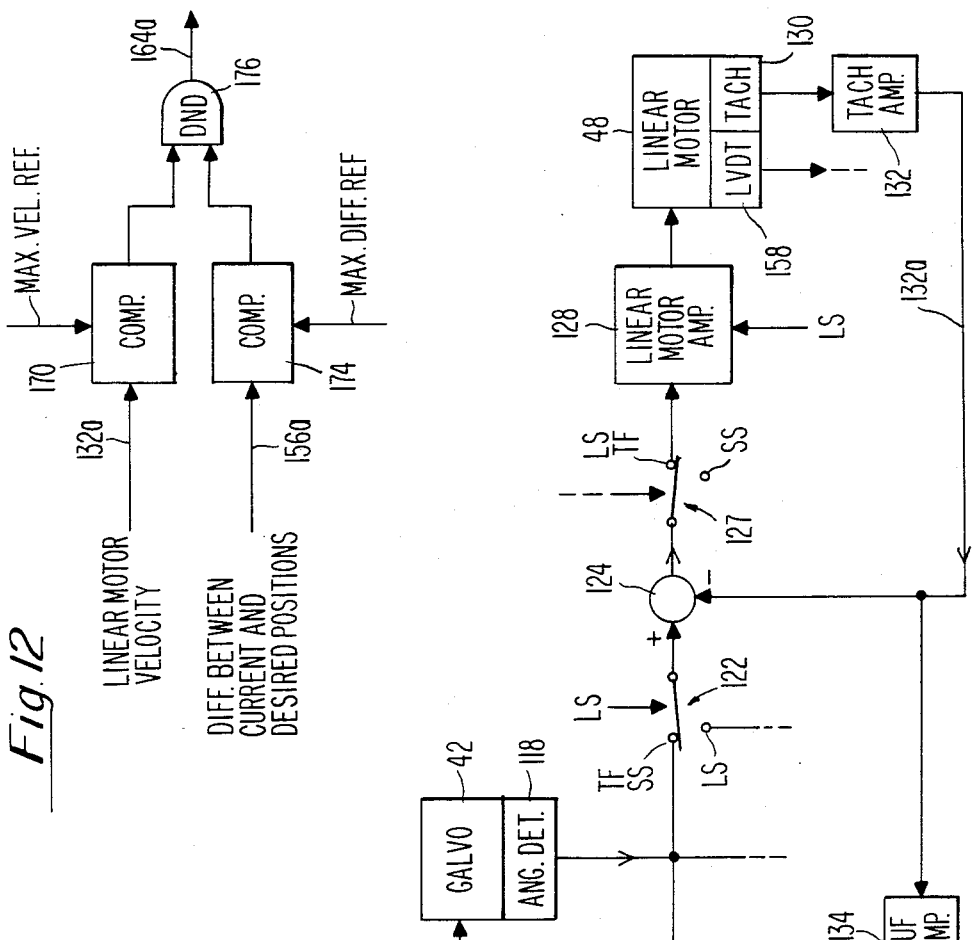
FIG. 9 is a block electrical diagram illustrating those portions of FIG. 8 which are pertinent to the performance of track following operations.
FIG. 12 is a preferred embodiment of the arrival detector shown in FIG. 11.
Figure 10:
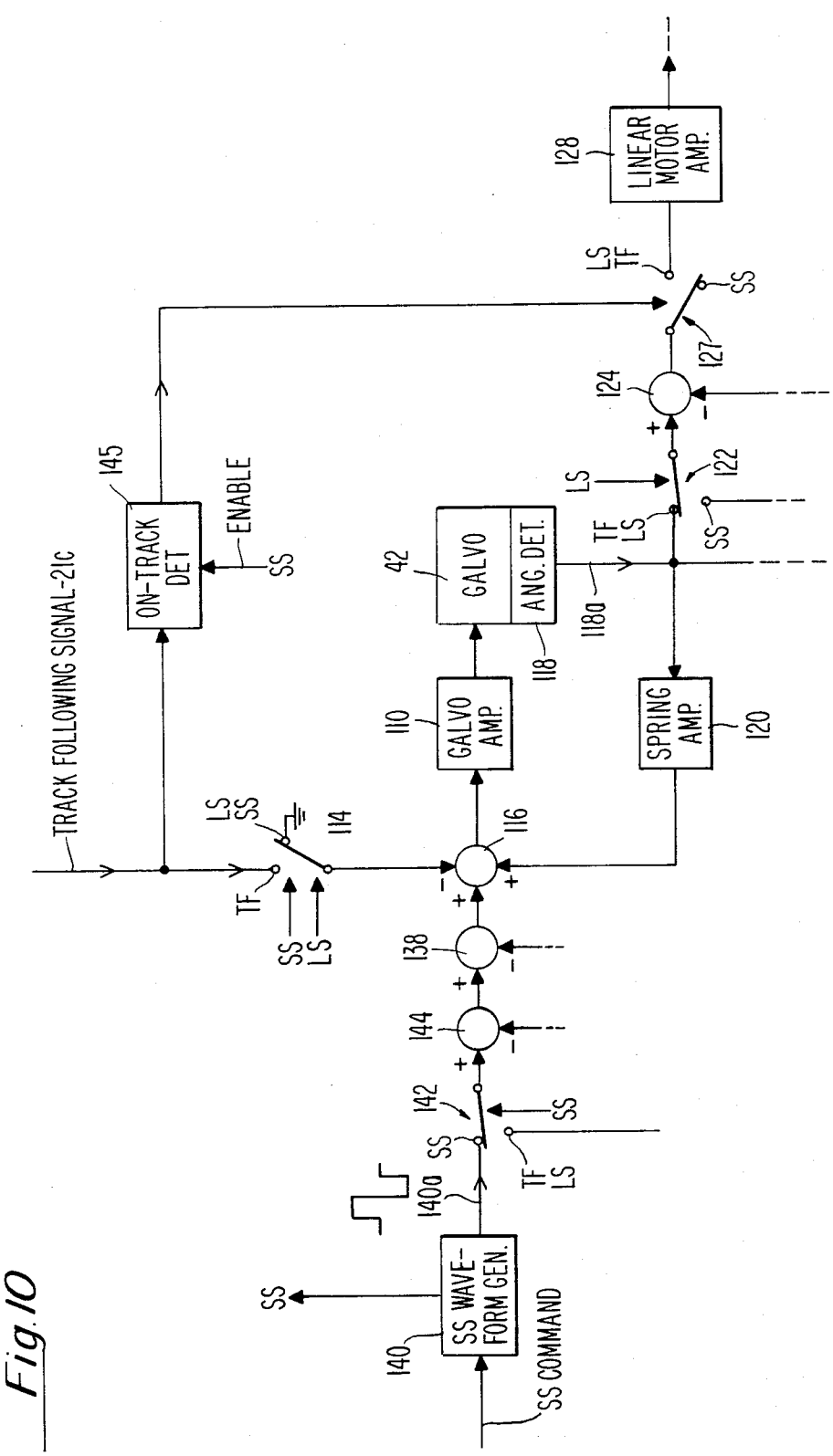
FIG. 10 is a block electrical diagram illustrating those portions of FIG. 8 which are pertinent to the performance of a short seek operation.

Having described the optical system embodiment disclosed in the aforementioned patent applications, the improvements in optical beam positioning control provided in accordance with the present invention will now be considered in detail with reference to FIGS. 8–10.

FIG. 8 is an electrical and schematic diagram illustrating apparatus for providing improved optical beam positioning control in accordance with the present invention. The optical disk 15, the objective lens assembly 44, the galvanometer 42 and the linear motor 48 shown in FIG. 8 correspond to like-numbered elements in FIG. 3. The remaining portions of FIG. 8 illustrate a preferred implementation for precisely controlling the movement of the galvanometer 42 and linear motor 48 which together control the position of the objective lens assembly 44 (and thus the position of the laser beams 12a, 12b and 12c) relative to the optical disk 15. The movements of the galvanometer 42 and the linear motor 48 are controlled in the preferred implementation of FIG. 8 so as to provide for the functions of track following and track seeking.

The track following function refers to the operation of the system which causes the laser beams to accurately follow one particular track unless the track is changed as a result of a track seeking operation. It has already been described in connection with FIGS. 5 and 6 how a track-following signal indicative of the positioning of the laser beams on a track can be obtained. The manner in which the preferred implementation of the present invention makes advantageous use of this track-following signal will become evident hereinafter.

The track seeking function refers to the operations involved in changing the position of the laser beams from a current track to another selected track. In the preferred implementation of FIG. 8, track seeking is categorized as a long seek or a short seek. A short seek provides for a relatively small track change of, for example, 50 tracks or less which can be provided, for example, in an average time of 200–400 microseconds and a maximum time of less than 1.5 milliseconds. A long seek provides for large track changes which, on a 40,000-track disk, can be many thousands of tracks.

The specific manner in which the above described track-following and track-seeking functions are advantageously achieved in the preferred implementation of FIG. 8 will now be considered in detail. The structure of FIG. 8 is based on the provision of a plurality of interactive servo loops which provide for unusually accurate and reliable control of the galvanometer 42 and the linear motor 48 during track-seeking and track-following operations.

Figure 11:
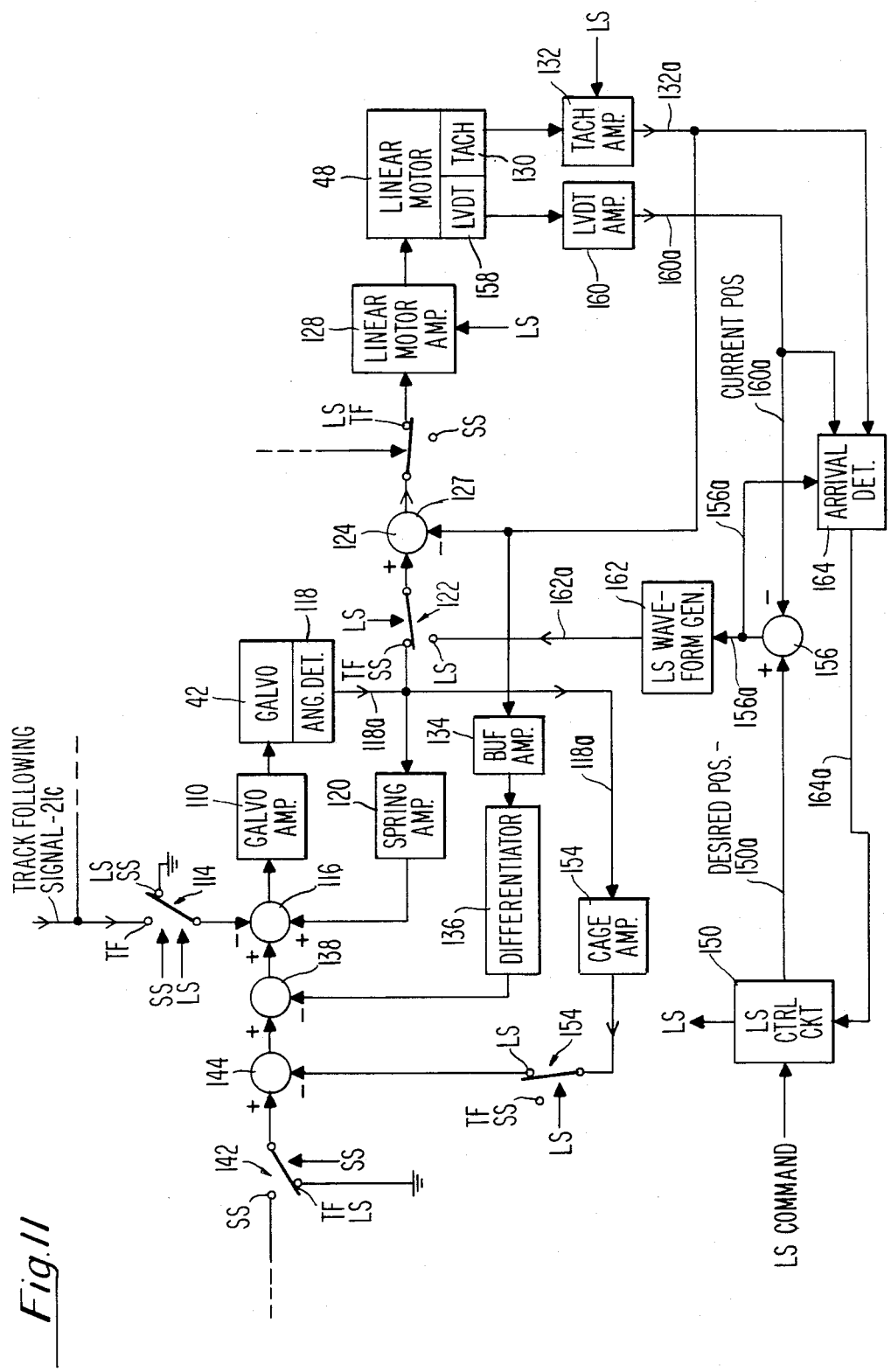
FIG. 11 is a block electrical diagram illustrating those portions of FIG. 8 which are pertinent to the performance of a long seek operation.

In order to simplify the description of FIG. 8 and permit its features and advantages to be clearly understood, the above desired functions—track-following, long seeking, short seeking—will be separately considered with reference to FIGS. 9, 10 and 11, respectively.

Each of the components illustrated in FIGS. 8–11 are readily providable by those skilled in the art and are thus not provided in greater detail. Also, in order to make FIGS. 8–11 easier to understand, the switching occurring between these three functions are indicated as being performed using single-pole, double-throw mechanical switches (for example, switches 122 and 128 in FIGS. 8 and 9) which switch in response to one or more labeled signals which are shown applied to the movable arm of the switch. The contacts of these switches are also labeled to indicate the function or functions to which each corresponds. The label "TF" indicates track following, the label "SS" indicates short seeking, and the label "LS" indicates long seeking. Those skilled in the art will be able to readily employ appropriate electronic switching circuitry to perform the switching indicated by these switches.

Also note in FIGS. 8–11 that each of the inputs to an analog summer (such as summers 116 and 138) is provided with a "+" or "−" to indicate whether the input is being provided in an additive or subtractive polarity relative to the other inputs to the summer.

Track Following (FIG. 9)

The track following function will be considered first with reference to FIG. 9 which shows only those portions of FIG. 8 which are pertinent to this function. As shown in FIG. 9, the galvanometer 42 is driven by a galvanometer amplifier 110 for controlling the galvanometer mirror 40 (FIG. 3). The basic servo loop involved in the track-following function illustrated in FIG. 9 is provided using the track following signal 21c derived by the signal processing electronics 20. The derivation of this signal has been described previously in connection with FIG. 6. It will be remembered that this track following signal is a measure of the preciseness of track following by the laser beams and is accordingly applied as an error signal to the galvanometer amplifier 110 via a switch 114 (which is in the position shown in FIG. 9 during track following) and an analog summer 116 for maintaining the laser beams on a particular track. In the preferred embodiment, the spacing of the tracks on the disk are chosen in conjunction with the dimensions of the track following pits 56 and 58 in FIG. 5 so that the laser beams will never hang up between tracks, but will always be following a track. The address of the particular track being followed can thus be obtained during track following at the output of the track and sector decoder 78 in FIG. 6, as described previously.

As shown in FIG. 9, the galvanometer 42 includes an angle detector 118 which provides an angle signal 118a representative of the current angular position of the galvanometer mirror 40 (FIG. 3). A suitable angle detector is described, for example, in the article "An Infra-Red Based Beam Scanner Position Sensor", P. M. Trethewey, Region 6 IEEE Student Paper Competition, Wescon/81, Hilton Hotel, San Francisco, Calif., SS/4. The angle detector signal 118 is employed in two ways in FIG. 9 during track-following operations. First, the angle signal 118a is applied to a spring amplifier 120 (having appropriate spring compensation characteristics) whose output 120a is in turn fed back to the galvanometer amplifier 110 via the summer 116 for providing spring compensation feedback for the galvanometer mirror.

Second, the angle signal 118a is applied, via switch 122 (which is in the position shown in FIG. 9 during track following), analog summer 124, switch 127 (which is also in the position shown during track following), to a relatively high gain linear motor amplifier 128. In response to the angle signal 118a, the amplifier 128 drives the linear motor 48 (also see FIG. 3) in a manner such that the galvanometer 42 (which is mechanically coupled to the objective lens assembly 44 in FIG. 3) is moved in a transverse direction relative to the track being followed so as to reduce the deflection required to be provided by the galvanometer mirror 40 (from its center or undeflected position) in order to maintain accurate track following. In other words, during track following, the movement of the linear motor 48 in response to the detected mirror angle signal 118a acts to maintain the galvanometer mirror near its center or undeflected position despite the presence of relatively large variations in track eccentricity. This achieves the advantageous result of providing the galvanometer mirror with a much greater effective dynamic range than would otherwise be possible, thereby permitting successful operation over relatively wide track position variations beyond that which the mirror would be capable on its own. The importance of this capability can be appreciated by realizing that on a disk in which the tracks are two microns apart, disk run-out due to spindle eccentricities typically produce track position variations during track folowing amounting to as much as ±35 tracks.

In order to provide even further stability and reliability during track following, the speed of the linear motor 48 is fed back to the galvanometer amplifier 110 as well as to the linear motor amplifier 128. This is accomplished using a tachometer 130 with the linear motor 48 whose output is amplified by a tachometer amplifier 132 for producing a velocity signal 132a which is applied to the linear motor amplifier 128 via the summer 124, and is applied to the galvanometer amplifier 110 via a buffer amplifier 134, a differentiator 136 and summers 138 and 116. The advantage of providing the differentiator 136 is that it permits rapid velocity changes to be anticipated by the galvanometer amplifier 110, thereby resulting in greater overall loop stability.

Short Seek (FIG. 10)

The short seek function is illustrated in FIG. 10 and will be seen to comprise the same components as the track following function illustrated in FIG. 9 with the addition of those components pertinent to the short seek function. These additional components are a waveform generator 140, a switch 142, an analog summer 144, and an on-track detector 145. Note also that switches 114, 127 and 142 are shown in their short seek positions. It will be understood that a short seek function is one which provides for movement of the laser beams from their current track to a predetermined track which is not greater than a specified number of tracks away from the current track. In the preferred embodiment being considered, the maximum number of tracks that the laser beams can be moved by a short seek operation is, for example, ±50 tracks. If the beams must be moved a greater number of tracks, then a long seek is used which will be described hereinafter.

As illustrated in FIG. 10, a short seek operation is initiated by the application of a short seek command to a short seek waveform generator 140. This short seek command is provided by the track selection circuit 80 (FIG. 6) whenever a newly selected track is within ±50 tracks of the current track. The short seek command contains information as to the direction and number of tracks which it is desired that the laser beams be moved. When a short seek command is received by the short seek waveform generator 140, it produces a short seek signal SS having a duration determined by the number of tracks to be moved—that is, a duration which is substantially equal to the expected time required for moving to the number of tracks called for by the short seek command. This short seek signal SS serves a number of purposes: (1) to place switch 142 in its short seek SS position and thereby connect the output of the short seek waveform generator 140 to the galvanometer amplifier via summers 144, 138 and 116, (2) to place switch 114 in its short seek SS position so as to open the track following loop by disconnecting the track following signal from the galvanometer amplifier, and (3) to enable the on-track detector 145 to monitor the track following signal so as to open switch 127 when an off-track condition is present (as during a short seek), thereby preventing movement of the linear motor 48 during the short seek operation.

The above described effects produced by the short seek signal SS permit the output 140a provided by the waveform generator 140 to be applied to the galvanometer amplifier 110 to exclusively control the galvanometer mirror (and thus the position of the laser beams) during a short seek operation without interference from the track following signal (since switch 114 will be open) or from the linear motor 48 (since switch 127 will be open), thereby permitting accurate control of laser beam movement in accordance with the output 140a provided by the short seek waveform generator 140. In the preferred embodiment, the output 140a provided by the short seek waveform generator 140 is chosen to be a doublet—that is, a pulse of one polarity followed by a pulse of opposite polarity. During the first pulse, the linear motor 48 accelerates and during the second pulse it decelerates. It has been found that the durations and amplitudes of these opposite polarity pulses can be chosen based on the mechanical characteristics of the system and the number of tracks to be moved, whereby the galvanometer 42 will rapidly and accurately move the galvanometer mirror so that the laser beams are moved the requested number of tracks. When the laser beams arrive in the immediate vicinity of the desired track, the short seek signal SS ends since, as pointed out above, its duration is chosen to be substantially equal to the time required for the laser beams to be moved the requested number of tracks in response to the waveform generator output 140a.

When the short seek signal SS ends, switches 114 and 142 return to their track following positions. Also, switch 127 returns to its closed position when the on-track detector 145 indicates that the laser beams are properly on a track, thereby reconnecting the angle detector 118 to the linear motor amplifier 128. The on-track detector 145 then returns to its disabled state until the next short seek operation.

As mentioned previously, the track following operations are chosen in conjunction with the track spacing so that the laser beams will not hang up between tracks, but will always come to rest on a track. If after the above described short seek operation, the track address provided by the track and sector decoder 78 in FIG. 6 indicates that the track on which the laser beams came to rest is not the one requested by the short seek operation, another short seek operation is initiated, and so on until the laser beams come to rest on the correct track. It has been found that no more than two short seeks are normally required to position the laser beams on the correct track, and normally only one short seek is required when the laser beams are to be moved less than 20 tracks.

Long Seek (FIG. 11)

The operation of the long seek function is illustrated in FIG. 11 which shows those components of FIG. 8 pertinent to this function. A long seek is initiated by a long seek command containing data which is applied to a long seek control circuit 150. The track selection signal 21b provided by the track selection circuit 80 (FIG. 6) is a long seek command whenever a newly selected track is greater than 50 tracks away from the current track. The long seek control circuit 150 responds to the applied long seek command to produce a long seek signal LS which serves a number of purposes: (1) to place switches 114 and 142 in their long seek LS positions so as to thereby open the track following loop and disconnect the short seek waveform generator 140 (FIG. 10), (2) to place switch 122 in its long seek position so as to disconnect the angle detector signal 118a from the linear motor amplifier 128 and instead connect a long seek waveform generator 162 thereto via summer 124, and (3) to place switch 154 in its long seek position so as to close a feedback loop which causes the detected mirror angle signal provided by the angle detector 118 to be applied to the galvanometer amplifier 110 via a cage amplifier 154 and summers 144, 138 and 116 so as to cause the galvanometer mirror to be driven to its zero angle position in which it remains during the long seek operation; this in effect "cages" the galvanometer mirror at its zero angle position so as to prevent it from interfering with the long seek operation which is performed using the linear motor 48, and (4) the long seek signal LS is also applied to the linear motor amplifier 128 and tachometer amplifier 132 for changing the gain of these amplifiers to values better suited to the long seek operation, the gain of the linear motor amplifier 128 being decreased, while the gain of the tachometer amplifier 132 is increased.

The long seek command applied to the long seek control circuit 150 in FIG. 11 contains data representative of a new track to which the laser beams are to be moved. In response to this long seek command, the long seek control circuit 150 produces an output signal 150a to an analog summer 156 having a magnitude indicative of the new position to which the linear motor 48 should be moved in order to correspond to the new track. The summer 156 also receives a signal 160a indicative of the position of the linear motor 130 derived from a linear variable differential transformer (LVDT) 158 coupled to the linear motor 48, the LVDT signal being applied to the summer 156 via an LVDT amplifier 160.

The resulting output 156a of the summer 156 in FIG. 11 is representative of the difference between the current position (indicated by LVDT 158) and the desired position indicated by the long seek command. The summer output 156a is applied to a long seek waveform generator 162. The long seek waveform generator 162 responds to the summer output 156a to generate an output signal 162a having a waveform chosen so that, when applied to the linear motor 48 (via switch 152, summers 124 and 126, switch 127 and the linear motor amplifier 148), the linear motor 48 is rapidly and smoothly moved to a position corresponding to the desired selected track. The arrival of the linear motor 48 at the selected position during a long seek operation in FIG. 11 is determined using an arrival detector 164 which is responsive to the outputs of the LVDT amplifier 160, the tachometer amplifier 132 and the summer 156 for providing an output signal 164a indicative of the completion of the long seek operation.

FIG. 12 illustrates a preferred implementation of the arrival detector 164 in FIG. 11. As indicated in FIG. 12 the tachometer amplifier output signal 132a is applied to a comparator 170 which compares the linear motor velocity represented by the signal 132a with a maximum velocity reference signal. When the linear motor velocity is below the maximum velocity represented by the maximum velocity reference signal, the comparator 170 produces a "true" or "1" output signal 170a which is applied to an AND gate 176.

Still with reference to FIG. 12, the summer output 156a in FIG. 11, which represents the difference between the current and desired positions of the linear motor, is applied to a comparator 174 which compares this difference signal 156a with a maximum difference reference signal. When the difference signal 156a is below the maximum difference value represented by the maximum difference reference signal, the comparator 174 produces a "true" or "1" output signal 174a which is also applied to the AND gate 176.

It will accordingly be understood that the resulting output 164a from the AND gate 176 in FIG. 12 will thus be "true" or "1" only when both the linear motor velocity and the difference between current and desired motor positions are below predetermined maximum values, thereby providing a highly stable and reliable detection of the arrival of the linear motor at the position called for by the long seek command (FIG. 11).

Returning now to FIG. 11, the arrival detector output signal 164a is applied to the long seek control circuit 150 which, in response thereto, turns off the long seek signal LS when the arrival detector 164 indicates that the linear motor 48 has arrived at a position corresponding to the selected track, thereby causing operation to return to track following, which has previously been described in connection with FIG. 9. It will be understood that, if upon return to track following, the track and sector decoder 78 (FIG. 6) determines that the laser beams are on the wrong track, then a short seek operation is initiated as described previously in connection with FIG. 10.

Although the description of the invention provided herein has been directed to a particular preferred embodiment, it is to be understood that many modifications in construction, arrangement, components, operation and use are possible without departing from the true scope and spirit of the present invention. For example, it is to be understood that the present invention is also applicable to other types of high density data storage systems. The appended claims are accordingly to be considered as encompassing all such possible modifications and variations.

What is claimed is:

1. In a high density data storage system including a recording medium having a plurality of spaced tracks, the combination comprising:
- means including a radiation beam for reading data recorded in a track on said medium;
- means providing for relative movement of said radiation beam along said track;
- means for deriving a track following signal indicative of the deviation of said radiation beam from a track being followed;
- first position control means coupled to said track following signal for moving said radiation beam to provide a track following operation such that said radiation beam follows said track;
- detecting means for detecting the movement of said first position control means during said track following operation;
- second position control means coupled to said detecting means and operating concurrently with said first position control means during said track following operation, said second position control means being responsive to said detecting means for providing movement of said first position control means so as to reduce the movement required thereby for maintaining said radiation beam following said track;
- means for disabling said track following operation when said beam is to be moved to a different track by disconnecting the coupling between said first position control means and said track following signal as well as the coupling between said second position control means and said detecting means;
- waveform generating means for providing a signal of predetermined shape to said first position control means when said track following operation is disabled, the predetermined shape of the signal provided by said waveform generating means being chosen based on the number of tracks that the beam is to be moved and the mechanical characteristics of said first position control means so that said first position control means will move said radiation beam the required number of tracks in response thereto; and
- means for enabling said track following operation after completion of movement by said first position control means in response to the signal provided by said waveform generating means.

2. The invention in accordance with claim 1, including means for additionally controlling the movement of said first position control means during said track following operation in response to the differentiated velocity of movement produced by said second position control means.

3. The invention in accordance with claim 1, wherein the signal provided by said waveform generating means provides a first pulse of one polarity followed by a second pulse of opposite polarity, and wherein the durations and magnitudes of said pulses are chosen in accordance with the number of tracks to be moved and the mechanical characteristics of the first position control means so that the beam is moved the required number of tracks.

4. The invention in accordance with claim 1, wherein said high density storage system is an optical storage system, wherein said radiation beam is a laser beam, and wherein said position control means comprises a galvanometer controlling an angularly deflectable optical element disposed in the path of said beam and whose angular position affects the transverse position of said beam relative to said track.

5. The invention in accordance with claim 4, wherein said optical element is a mirror.

6. The invention in accordance with claim 4, wherein said recording medium is a rotatable disk having a large plurality of spaced concentric tracks, and wherein the spacing between tracks is chosen in conjunction with the operation of said track following means so that said beam always ends up following a track on said disk.

7. The invention in accordance with claim 6, including means for initiating another movement of said beam when said beam ends up on a wrong track, the shape of the signal provided by said waveform generating means being chosen to move said beam to the correct track.

8. The invention in accordance with claim 1, 2, 3, 4, 5, 6 or 7, wherein said means for enabling the operation of said track following means includes:
- means for reconnecting the coupling between said first position control means and said track following signal after completion of the movement by said first position control means in response to said waveform generating means;
- means for determining when said beam is properly following a track after the above mentioned reconnection of the coupling between said first position control means and said track following signal; and
- means for reconnecting the coupling between said second position control means and said detecting means when it is determined that said beam is properly following a track.

* * * * *